(Specimens.)
T. H. VIDETO.
WATER PROOF GOSSAMER FABRIC.
No. 375,233. Patented Dec. 20, 1887.
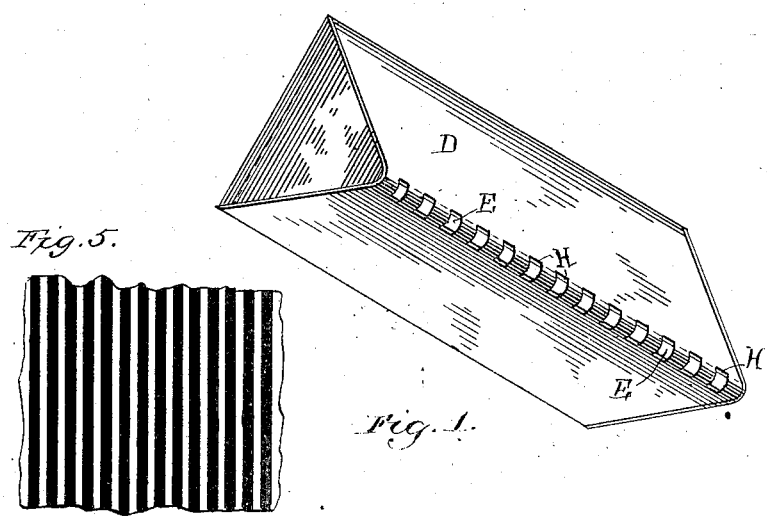
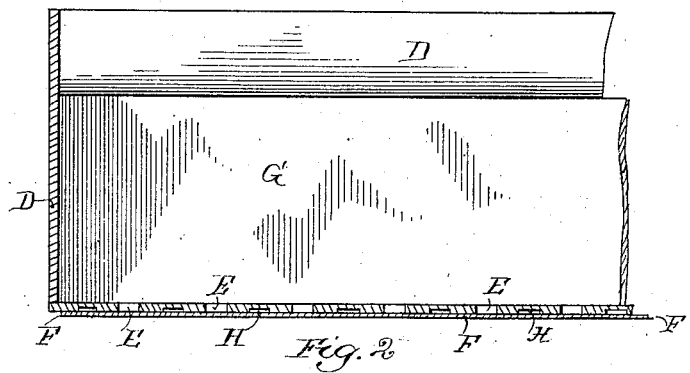
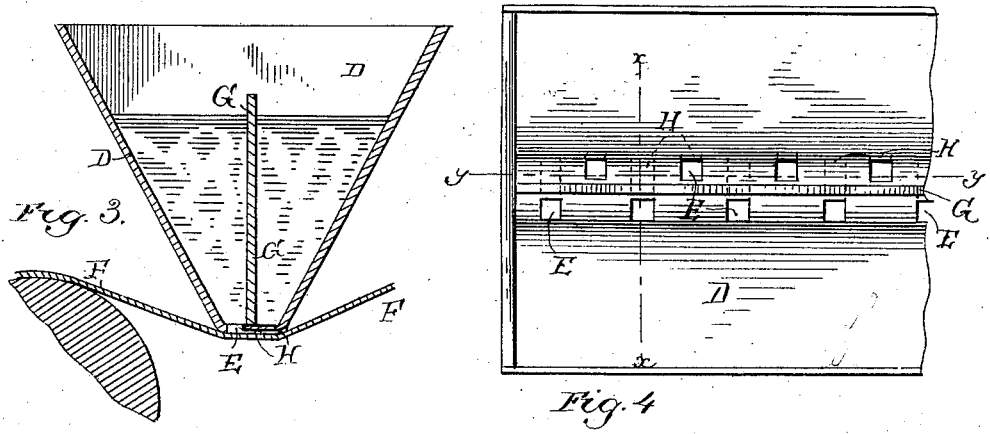
Witnesses.
Inventor.
Theodore H. Videto.

United States Patent Office.

THEODORE H. VIDETO, OF HYDE PARK, ASSIGNOR OF ONE-HALF TO L. DEWART APSLEY AND JUDSON H. COFFIN, BOTH OF HUDSON, MASSACHUSETTS.

WATER-PROOF GOSSAMER FABRIC.

SPECIFICATION forming part of Letters Patent No. 375,233, dated December 20, 1887

Application filed October 6, 1886. Serial No. 215,442. (Specimens.)

*To all whom it may concern:*

Be it known that I, THEODORE H. VIDETO, of Hyde Park, in the county of Norfolk and State of Massachusetts, have invented a new and useful Improvement in Water-Proof Fabrics and Methods and Means of Finishing the Same, of which the following, taken in connection with the accompanying drawings, is a specification.

My invention relates to improvements in that class of goods known as "gossamer fabrics," the object of which is to produce a fabric which will be light and durable, and at the same time have a highly artistic and finished appearance.

My invention consists of a fabric coated with films of rubber in solution, the finishing-film being composed of rubber in solution, and of a contrasting color with the other films, and laid on the ground or first films to form stripes, the entire surface of the fabric when finished presenting a velvety or dull finished appearance.

In carrying out my invention to produce the article above described I may use a serrated or notched knife, such as is described and claimed in Letters Patent No. 371,155, granted to me October 4, 1887; but I prefer to use the trough-knife herein shown and described, and which forms the subject of a separate application filed November 6, 1887, Serial No. 251,654, the process being also embraced in an application filed by me June 23, 1887, Serial No. 242,305.

Figure 1 is a perspective view of the trough-shaped knife, showing the perforations and grooves. Figs. 2 and 3 are sections. Fig. 4 is a plan view of my trough-shaped knife with a longitudinal partition. Fig. 5 is a plan view of the fabric.

F indicates the thin fabric to be coated and striped with a rubber compound in solution. The fabric, in the form of an endless belt, is supported by suitable rolls, which distend the fabric and move it longitudinally in the usual way, its upper surface being pressed up against the edge of the knife or blade in order to apply its several successive films of rubber solution, as is now generally practiced in making plain gossamer fabrics. After this foundation of rubber coating or film has been spread evenly onto the fabric and before vulcanizing, the straight-edge knife used for applying these continuous films is removed and the trough-shaped knife shown in the drawings is substituted to form the stripes of rubber.

D indicates my trough-shaped knife mounted in suitable supports and adapted to receive the rubber in solution and deliver the same upon the fabric through the perforations E, formed in the bearing-face of the trough D. The perforations E extend into shallow grooves H the number and width and distance apart of the stripes. Without the grooves the rubber compound in solution will not form the stripes properly, as the cloth, with its foundation-coatings, is sagged by the pressure of the knife upon it, and hugs up so close under the ridge of the trough-knife that it prevents the proper escape of the semi-liquid compound through the perforations; but with the shallow grooves this difficulty is obviated. In the manufacture of my improved fabric I prefer to use this trough-knife rather than the notched knife described in my application, Serial No. 210,892, for the reason that stripes of different-colored rubber compounds can be applied simultaneously by means of a partition, G, running through the trough. In this instance the openings E are placed on each side of the partition staggered, as indicated in Fig. 4; or a number of partitions, G, may be otherwise arranged to enable the operator to apply more than two different-colored stripes as the finishing-film of rubber fabric.

The several perforations and grooves may of course be of different widths to form wide and narrow stripes.

I am aware that a fabric having stripes and other designs printed thereon with an ink composed partly of rubber is not new, and that such fabric has a shiny and lustrous appearance.

I am also aware that a fabric having a portion of its surface made lustrous by a starch-finish and ornamented with various figures is not new, and such I do not claim, as my fabric is clearly distinguishable from all others in that it has a velvety dull finish, and that the stripes are composed of a rubber solution.

What I claim is—

5. The improved gossamer fabric herein described, consisting of a woven fabric coated with films of rubber in solution, the finishing-film forming rubber stripes, and the entire surface being velvety or dull finished as distinguished from a lustrous or a shiny-printed surface.

In testimony whereof I have signed my name to this specification, in the presence of two subscribing witnesses, on this 9th day of September, A. D. 1886.

THEODORE H. VIDETO.

Witnesses:
A. H. SPENCER,
J. C. KENNEDY.